(12) United States Patent
Speight (10) Patent No.: US 10,230,637 B2
(45) Date of Patent: Mar. 12, 2019

(54) WIRELESS COMMUNICATION UNIT AND METHOD FOR SHARING DELAY TOLERANT CONTENT

(71) Applicant: Virtuosys Limited, Bath and North East Somerset (GB)

(72) Inventor: Timothy James Speight, Monmouthshire (GB)

(73) Assignee: Virtuosys Limited, Bath and North Somerset (GB)

( * ) Notice: Subject to any disclaimer, the term of this patent is extended or adjusted under 35 U.S.C. 154(b) by 44 days.

(21) Appl. No.: 15/459,874

(22) Filed: Mar. 15, 2017

(65) Prior Publication Data

US 2017/0272361 A1 Sep. 21, 2017

(30) Foreign Application Priority Data

Mar. 17, 2016 (GB) .................................. 1604540.3

(51) Int. Cl.
*H04L 12/741* (2013.01)
*H04L 29/08* (2006.01)
(Continued)

(52) U.S. Cl.
CPC .......... *H04L 45/745* (2013.01); *H04L 49/252* (2013.01); *H04L 63/0428* (2013.01);
(Continued)

(58) Field of Classification Search
None
See application file for complete search history.

(56) References Cited

U.S. PATENT DOCUMENTS

2008/0313284 A1   12/2008   Doyle
2010/0125901 A1*   5/2010   Bathrick ................. H04L 45/00
                                                                   726/13
(Continued)

FOREIGN PATENT DOCUMENTS

EP   2 445 303 A1   4/2012
WO   2009/066854 A1   5/2009
WO   2015/133055 A1   9/2015

OTHER PUBLICATIONS

Extended European Search Report; European Patent Application No. 17161091.8-1853 dated May 23, 2017 (9 pages).
(Continued)

*Primary Examiner* — Anh Ngoc M Nguyen
(74) *Attorney, Agent, or Firm* — Fitch, Even, Tabin & Flannery LLP (57) ABSTRACT

A wireless communication unit is arranged to communicate with one or more wireless mobile communication units. The wireless communication unit comprises: a cellular receiver arranged to receive content from a network server using a conventional client server mechanism; a processor operably coupled to the cellular receiver and configured to convert the received content into a bundle format that can be transmitted into a delay tolerant network; at least one memory operably coupled to the processor and configured to store the bundle formatted content; and at least one short-range wireless circuit operably coupled to the at least one memory and configured to extract the bundle formatted content from the at least one memory and transmit the extracted bundle formatted content to at least one wireless mobile communication unit using a short-range wireless communication technology.

20 Claims, 5 Drawing Sheets

(51) Int. Cl.
*H04W 4/80* (2018.01)
*H04L 12/947* (2013.01)
*H04L 29/06* (2006.01)
*H04W 48/16* (2009.01)
*H04W 88/06* (2009.01)
*H04W 80/06* (2009.01)
*H04W 84/00* (2009.01)
*H04W 84/18* (2009.01)

(52) U.S. Cl.
CPC ...... *H04L 67/2833* (2013.01); *H04L 67/2842* (2013.01); *H04L 67/2861* (2013.01); *H04L 67/42* (2013.01); *H04L 69/163* (2013.01); *H04L 69/26* (2013.01); *H04W 4/80* (2018.02); *H04W 48/16* (2013.01); *H04W 80/06* (2013.01); *H04W 84/005* (2013.01); *H04W 84/18* (2013.01); *H04W 88/06* (2013.01)

(56) References Cited

U.S. PATENT DOCUMENTS

| | | |
|---|---|---|
| 2014/0243100 A1 | 8/2014 | Chan |
| 2016/0028830 A1 | 1/2016 | Coglitore et al. |
| 2016/0212599 A1* | 7/2016 | Kudou ................. H04W 40/20 |
| 2016/0323804 A1* | 11/2016 | Fujita .................... H04W 40/00 |
| 2017/0317736 A1* | 11/2017 | Wakafuji ............. H04W 48/16 |

OTHER PUBLICATIONS

British Patent Application No. G1604540.3; Combined Search and Examination Report Under Sections 17 and 18(3) dated Sep. 9, 2016.

\* cited by examiner

WIRELESS COMMUNICATION UNIT AND METHOD FOR SHARING DELAY TOLERANT CONTENT

RELATED APPLICATION(S)

This application claims the benefit of United Kingdom Application No. 1604540.3 filed Mar. 17, 2016. The content of this application is fully incorporated herein in its entirety.

TECHNICAL FIELD

The field of this invention relates generally to wireless communication units and methods for sharing content, for example delay tolerant content, within wireless cellular communication systems. In particular, the field of this invention relates to downlink communication using bundle protocol gateway nodes.

BACKGROUND

A recent development from the third generation (3G) wireless communications is the long term evolution (LTE) cellular communication standard, sometimes referred to as $4^{th}$ generation (4G) systems. Both of these technologies are compliant with third generation partnership project (3GPP™) standards. A conventional mobile cellular network is based on a star topology where the central node, referred to as an eNodeB in 3GPP™ parlance, is the cell site and the other nodes wirelessly connected to the central node are subscriber units, referred to as user equipment (UEs) in 3GPP™ parlance. The connection to the cell site is made via a wireless interface and is possible if the UEs are within wireless coverage of the cell.

Various communication nodes/devices are known that are used to support cellular and short range communication. For example, edge routers not only manage a mesh network and communicate with end nodes or mesh routers, but also provide routing into the wider IP network, typically a cellular network or the public internet via a backhaul link. This links the mesh network to the cellular network and routes traffic between the two technologies. A backhaul link can be accomplished by a number of technologies, for example a wired Ethernet connection, WiFi™ link or possibly a cellular technology connection. This results in networks that have to be planned. There is at least one edge router in each mesh cluster.

Mesh router devices are communication devices that communicate using mesh transport technology (typically WiFi™) to either an edge router (often located on the extremities of a cellular network and connected to the wider IP network, typically or the public internet via a backhaul link) or another mesh router. Mesh routers are able to support routing in the mesh network, i.e. they can relay data or traffic from a second node (either an end node or another mesh router) towards the edge router.

End nodes are communication devices that communicate using mesh transport technology (typically WiFi™) to either an edge router or a mesh router. An end node device provides no routing functionality for data from other devices. End node communication devices do not have routing capability and can only operate as 'leaves' in the mesh network.

A conventional mobile ad hoc network (also called wireless mesh network) includes a contemporaneous continuous connection between the source and destination nodes. Conventional routing protocols, such as AODV (see RFC 3561) or OLSR (RFC 3626), can be employed. Another class of wireless network architecture exists where node density is low and/or communication range of the nodes is also low, such that a contemporaneous end to end path does not exist between source and destination nodes. Conventional routing protocols, such as the aforementioned AODV and OLSR will not work. However, this does not mean that packets can never be delivered in such networks. Over time, different links come up and down, due to node mobility, and these sporadic contacts can be exploited to move data closer to its intended target. Such ad hoc networks would typically use only short range communications such as WiFi or Bluetooth, with such schemes using, in effect, a 'store and carry forward' mechanism. Packets are stored and rely on the movement of the mobile node user to carry the data around the network.

Unlike conventional networks nodes, such ad hoc networks cannot be sure whether a contact will occur in the future that will move the packet towards the intended destination. Thus, data packets must be moved to nodes speculatively in the hope that they encounter the destination node, or at least a node closer to the destination. These networks are therefore termed opportunistic networks.

An aspect that is prevalent in opportunistic networks is that delivery of packets in an opportunistic network has high, and potentially unbounded latency, there is no guarantee a packet can be ultimately delivered. Conventional transport/network layer protocols like TCP/IP cannot work in such networks where latency is high and unpredictable. Timeouts will occur within these protocols and data will be discarded.

Another technique that is commonly used is to replicate the packet and pass the replica on to any encounter node. This leads to so called 'epidemic routing', where a packet is spread throughout the network until it reaches its intended destination.

To assist communication networks to provide additional functionality, the concept of bundle protocols has been developed. A bundle protocol has found particular use as an experimental disruption-tolerant networking (DTN) protocol designed for unstable communications networks. Here, it groups data blocks into bundles and transmits them using a store-and-forward technique. Bundle protocols connect multiple subnets into a single network and provide a custody-based retransmission service. It is known that nodes employing bundle protocols may store data for long periods.

A bundle protocol, as defined in RFC 5050 and RFC 4838, was originally developed for space communications. However, it has since been recognised as being applicable to fractured networks, such as those described above. The bundle protocol creates self-contained messages or bundles that are the primary unit of communication. The bundle protocol sits between the application layer and network layer and provides storage functionality to hold bundles until a communication link become available.

Figure 1:
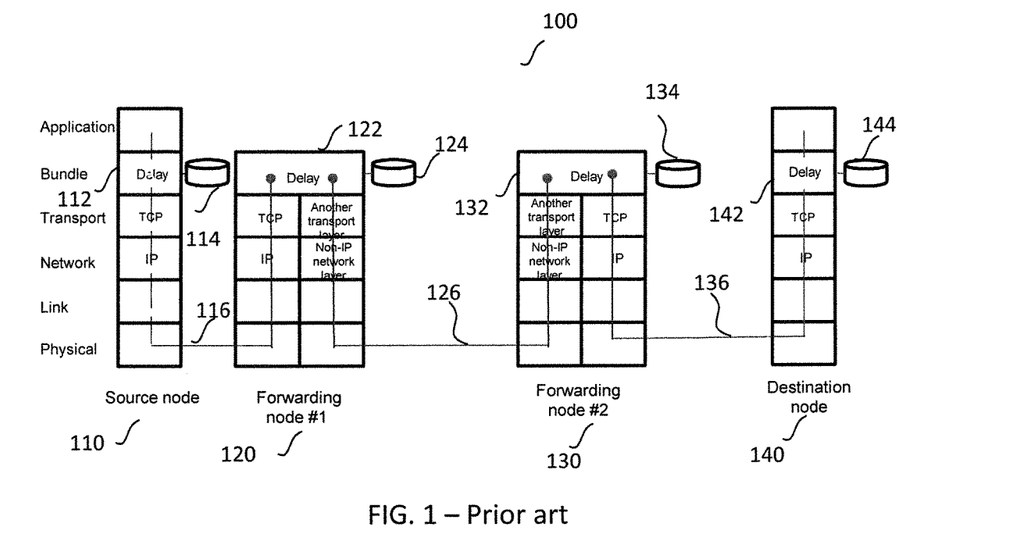
FIG. 1 illustrates a layer overview of a known wireless communication system, whereby one or more low latency links exist between a source node and a destination node when data is passed over one or more forwarding nodes.

FIG. 1 illustrates a layer overview of a known wireless communication system 100 that operates a bundle protocol, whereby one or more low latency links exist between a source node and a destination node when data is passed over one or more forwarding nodes. Using a bundle protocol is key to the operation of delay tolerant networks, as it allows not only transient networks to be connected but also allows different network/transport layers to be used. In transient networks transport control protocol/Internet protocol (TCP/IP) cannot be used in an end-to-end manner, as the communication link times out well before a connection could be made Furthermore, in transient networks, conventional routing protocols will not work either.

In FIG. 1, a low latency link exists between the source node 110 and forwarding node #1 120 and forwarding node #2 130 and destination node 140. Note that conventional transport control protocol/Internet protocol (TCP/IP) can be used between these nodes. Between forwarding node #1 120 and forwarding node #2 130 an intermittent link 126 exists but is also very high latency. Thus, different lower protocol layers are used in this link.

Source node 110 is illustrated as comprising multiple protocol layers, e.g. physical layer, a link layer, a network layer operating with Internet Protocol (IP), a transport layer operating with a Transport Control Protocol (TCP), an application layer and notably a bundle layer 112. When using a bundle protocol layer 112, all the information that is to be sent is bundled in a single data package, which can be stored in store 114 and only transmitted when connectivity to the next bundle hop exists. In this case the bundle is then sent when connectivity 116, 126, 136 becomes available between intermediate nodes in the system, where the intermediate nodes, e.g. forwarding node #1 120 and forwarding node #2 130, may in turn use (or not use) TCP/IP. In order to account for the fact that connectivity 126 and 136 are intermittent, data is delayed and stored at 124 and 134 until this connectivity becomes available.

In this manner, with the use of the bundle protocol, communications is possible within fractured networks, where such networks are termed delay (or disruption) tolerant networks (DTNs), i.e. the repeated introduction of additional delays in delivering the data is deemed acceptable, as the data is delay tolerant.

Even with a use of appropriate protocols, such as the bundle protocol illustrated in FIG. 1, routing around opportunistic DTNs is still inefficient. Thus, often such (opportunistic delay tolerant) networks are not used to send data to a specific node (although as discussed this is possible), but simply to disseminate information within a network. For instance, a user may wish to share a photo that (s)he has taken with members of their social network. In this case, bundle protocol could be used along with simple epidemic routing to get the picture to all members of his/her social network. In effect, rather than node centric routing, an information centric routing mechanism exists, where spreading data around the area is performed and only those who are interested will consume the data themselves e.g. those 'members' of his/her social network. This form of data dissemination is often described as 'publish and subscribed', and is different to the traditional client/server model.

As previously mentioned low node density results in a lack of contemporaneous end-to-end paths. This increases the node density by adding special nodes which can aggregate traffic within a delay tolerant network and can improve overall performance. Such special nodes are sometimes referred to as 'throwboxes'.

Figure 2:
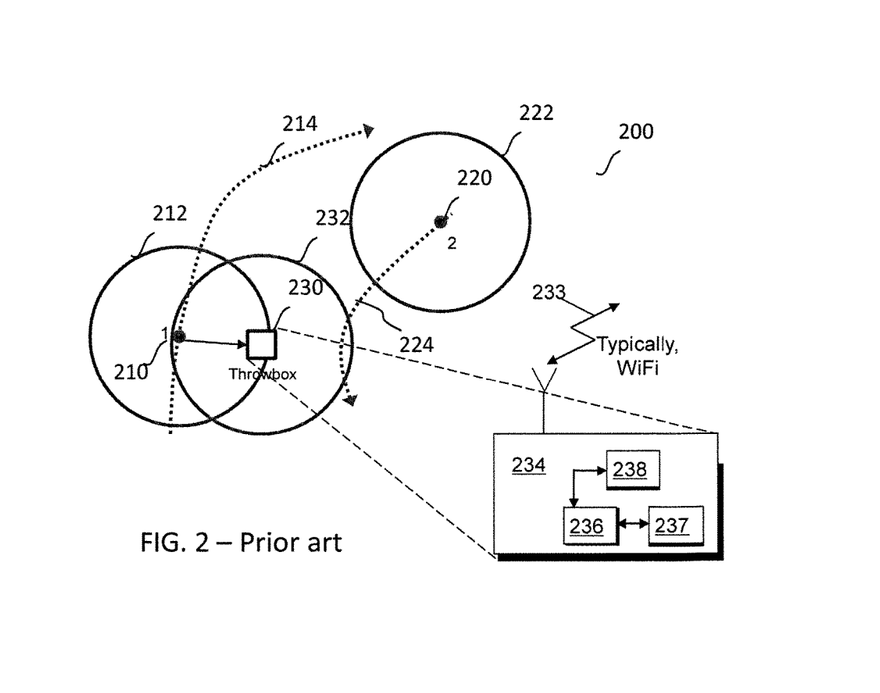
FIG. 2 illustrates an overview of a known wireless communication system comprising block diagram of a throwbox.

FIG. 2 illustrates an overview of a wireless communication system 200 comprising block diagram of a known throwbox 234. The known throwbox 234 is similar to other nodes in the network, albeit that it typically also uses low range communications circuitry 238, to transmit or receive 233 short range, e.g. WiFi™ communications, and a memory storage function 236. The known throwbox 234 comprises a controller 237 configured to manage the data in the throwbox 234. For instance, the controller 237 controls transferring data to/from passing communications nodes, such as node #1 210 on path 214 and node #2 passing on path 224. The passing communications nodes may be presented with a list of the available data stored in the throwbox 234 and may be asked to subscribe to, say, a particular communication channel to receive the available data. The controller 237 may also be configured to allow the uploading of data from passing communications nodes too, and then place then in appropriate subscription channels. In this manner, when a passing communications node encounters the throwbox 234 it may upload information onto it or download information from it.

When the wireless communication system 200 of FIG. 2 functions as an opportunistic DTN, data may be propagated through the system using such throwboxes. For example, a passing communication node such as node #1 210 on path 214 encounters the throwbox 234 it may upload information onto it. At a later date a second passing communication node (node #2 220) encounters the throwbox 234 and it queries the throwbox 234 for any data that it might be interested in. In this case the data uploaded from the first communication node (node #1 210) is downloaded. In this example, it is noteworthy that first and second smartphones never encounter each other but data is transferred therebetween through use of the known throwbox 234. Thus, the known throwbox 234 provides a means of increasing the node population and, thus, improving the speed/efficiency of data dissemination, as well as to offer a large store and management function of data.

The inventors of the present invention have identified an improved mechanism for providing data content that is delay tolerant to communication units/end nodes, particularly when located outside of, say, a cellular network, and without real-time access to the cellular network or a wider IP network via a mesh router connected concurrently with an edge router.

SUMMARY OF THE INVENTION

In a first aspect of the invention, a wireless communication unit is arranged to communicate with one or more wireless mobile communication units. The wireless communication unit comprises: a cellular receiver arranged to receive content from a network server using a conventional client server mechanism; a processor operably coupled to the cellular receiver and configured to convert the received content into a bundle format that can be transmitted into a delay tolerant network; at least one memory operably coupled to the processor and configured to store the bundle formatted content; and at least one short-range wireless circuit operably coupled to the at least one memory and configured to extract the bundle formatted content from the at least one memory and transmit the extracted bundle formatted content to at least one wireless mobile communication unit using a short-range wireless communication technology.

In this manner, data content that is delay tolerant to communication units/end nodes, is delivered to mobile wireless communication units with short-range wireless communication technology in a more efficient manner.

In an optional example of the invention, the processor may be further configured to manage a status of data content and download new data content in bundle format to the at least one memory if new data content is available from the network server. In an optional example of the invention, the status of data content may comprise a list of delay tolerant network, DTN, bundles, and/or versions thereof. In an optional example of the invention, the processor may be further configured to maintain a list of services available in an opportunistic network.

In an optional example of the invention, the processor may be further configured to download data content related to those services from the list. In an optional example of the invention, the processor may be further configured to update the list in response to constructing a new bundle of content.

In an optional example of the invention, the processor may be further configured to wirelessly advertise the list of services short range wireless communication technology as a bundle to at least one passing wireless mobile communication unit. In an optional example of the invention, the at least one short-range wireless circuit may comprise at least one short-range wireless receiver operably coupled to the processor and configured to receive and process a message indicating an interest in a bundle of content. In an optional example of the invention, the processor may be configured to receive the indication of the interest in the bundle of content from the at least one passing wireless mobile communication unit and in response thereto and compare the indication of interest in the bundle of content with bundle of content stored in the at least one memory, and connect to the at least one passing wireless mobile communication unit if there is a match. In an optional example of the invention, in response to a match, the processor may be configured to extract matched bundle formatted content from the at least one memory and transmit the extracted matched bundle formatted content to the at least one wireless mobile communication unit using the short range wireless communication technology.

In an optional example of the invention, the processor may be configured to control the data obtained by the processor and hence control the content of data published into the DTN network. In an optional example of the invention, the processor may generate a message to inform the recipient of which keys to use when ciphering and authenticating the data published into the DTN network.

In an optional example of the invention, the processor may be configured to transmit speculatively other bundle formatted content to the at least one wireless mobile communication unit using the short range wireless communication technology when connected thereto.

In an optional example of the invention, the content may be converted to a bundle as defined in RFC 5050.

In an optional example of the invention, the cellular receiver and processor may be configured to receive geographically relevant content from a network server using a conventional client server mechanism related to a geographical location of the wireless communication unit for distribution to passing wireless mobile communication units within its geographical area using short range wireless technology. In some examples, the geographically relevant information retrieval may be as a result of the configurations supplied by a network node that controls the content published by each wireless communication unit, e.g. a connected throwbox.

In a second example of the invention, an integrated circuit for a wireless communication unit, according to the first example, is described.

In a third example of the invention, a method for sharing delay tolerant content is described. The method comprises, at a wireless communication unit: receiving content over a cellular network from a network server using a conventional client server mechanism; converting the received content into a bundle format that can be transmitted into a delay tolerant network; storing the bundle formatted content in at least one memory; extracting the bundle formatted content from the at least one memory; and transmitting the extracted bundle formatted content to at least one wireless mobile communication unit using a short range wireless communication technology.

In a fourth example of the invention, a non-transitory tangible computer program product comprising executable code stored therein for sharing delay tolerant content is described, wherein the code is operable for, when executed at a wireless communication unit, performing the method of the third example.

In a fifth example of the invention, a wireless communication system that comprises a cellular network and at least one wireless communication unit arranged to communicate with one or more wireless mobile communication units is described, where the wireless communication unit is according to the first example.

In a sixth example of the invention, a network node for communicating with a wireless communication unit according to the first aspect is described. The network node comprises a processor coupled to a transmitter and configured to manage the content associated with a list of services that is downloaded to the wireless communication unit and subsequently converted into bundles for distribution in an opportunistic network.

In a seventh example of the invention, a mobile wireless communication unit for communicating with a wireless communication unit is described. The mobile wireless communication unit comprises: at least one short-range wireless circuit and configured to receive content in a bundle format over a delay tolerant network, using a short range wireless communication technology, wherein the bundle formatted content had been converted from content received from a network server over the cellular network using a conventional client server mechanism; and a processor operably coupled to the at least one short-range wireless circuit and configured to extract the bundle formatted content for use by the mobile wireless communication unit.

BRIEF DESCRIPTION OF THE DRAWINGS

Further details, aspects and embodiments of the invention will be described, by way of example only, with reference to the drawings. In the drawings, like reference numbers are used to identify like, or functionally similar, elements. Elements in the figures are illustrated for simplicity and clarity and have not necessarily been drawn to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be further appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Example embodiments of the present invention are described with respect to a wireless communication unit that has some cellular user equipment (UE) functionality and provides WiFi™ connectivity too. In examples of the invention, the wireless communication unit(s) will be described in terms of being an improved throwbox, due primarily to the described applications generally using a fixed geographic location of the wireless communication unit. However, it is envisaged that many other wireless communication units can be used to implement the hereinafter described concepts, such as smartphones, so long as they typically have some cellular UE functionality and provide WiFi™ connectivity too. Example embodiments describe, in general terms, a data ingress point for data content being provided to a wireless communication unit, within, or attached to, cellular coverage area.

In examples of the invention, the wireless communication unit(s) (sometimes referred to hereinafter as a 'connected throwbox') may be a stationary device and sends bundles to passing communication nodes, such as smartphones, that come into WiFi™/802.11 range even though they and the connected throwbox are both still in coverage. Once the data has been passed onto the smartphones the data may be passed between each or a number of them, which may ultimately lead to data being passed to devices that are out of cellular coverage, and may lead to distribution of the data content to one or more other (remote) wireless communication units. In other example embodiments, a data ingress point for data content being provided to a wireless communication unit, may be provided outside (and not attached to) a cellular coverage area.

In some examples, the term data content may comprise any form of data, including delay tolerant data (e.g. that is not necessarily to be used or read immediately), data traffic and any other information, in whatever form.

In some examples, a mobile wireless communication unit may be configured to receive data content, e.g. in a form of data packets, within or connected to a cellular or IP network, for storing and potentially re-distributing, transmitting or broadcasting, irrespective of whether or not it is located inside or outside of cellular coverage. In some examples, the data content may be received by the connected throwbox using a first technology such as using a direct LTE™ technology, and thereafter potentially re-distributing the data content using another short-range technology, e.g. using a WiFi™ or Bluetooth™ technology.

In some examples, the (passing) mobile wireless communication unit may configure itself for peer-to-peer communication in order to access the data content from the connected throwbox and/or subsequently transmit the accessed data content to at least one other mobile wireless communication unit.

Although examples of the invention are described with regard to a mobile wireless communication unit, such as a smartphone or user equipment (UE), transitioning into and outside of mesh network and/or cellular coverage, it is envisaged that the concepts described herein may be employed by any communication unit with wireless capability that is capable of being configured for peer-to-peer communication.

Figure 3:
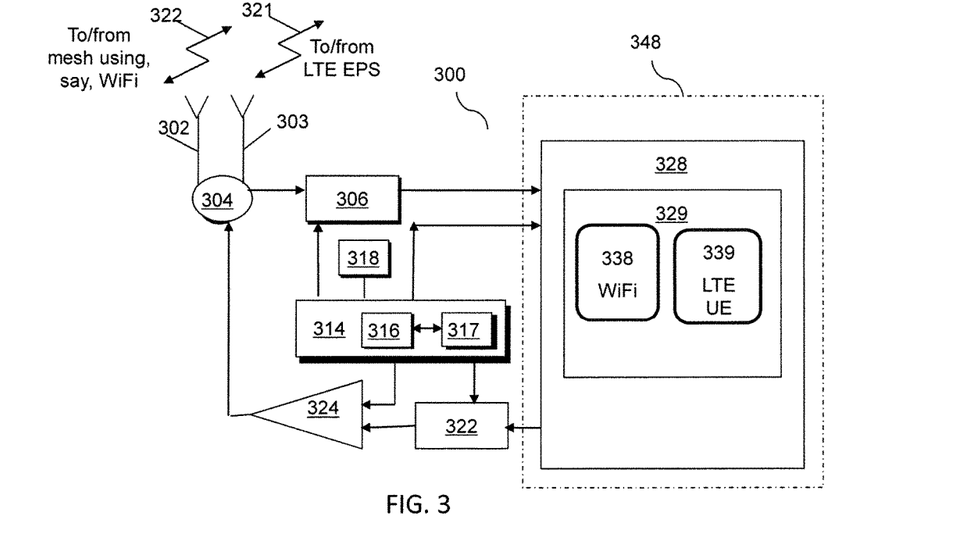
FIG. 3 illustrates an example block diagram of a wireless communication unit such as a throwbox, in accordance with some example embodiments of the present invention.

Referring now to FIG. 3, a block diagram of a wireless communication unit, such as a connected throwbox 300, adapted in accordance with some example embodiments of the invention, is shown. In accordance with examples embodiments, the throwbox 300 contains an antenna 303, for receiving/transmitting LTE™ cellular transmissions 321, as well as an antenna 302, for receiving/transmitting short range communications, such as WiFi™ 322. The antennae 302, 303 are coupled to an antenna switch or duplexer 304, which provides isolation between receive and transmit chains within the wireless communication unit 300, and which may additionally provide isolation between LTE™ and WiFi™ circuitry.

One or more receiver chains, as known in the art, include receiver front-end circuitry 306 (effectively providing reception, filtering and intermediate or base-band frequency conversion). The receiver front-end circuitry 306 is coupled to a signal processor 328 (generally realized by a digital signal processor (DSP)). A skilled artisan will appreciate that the level of integration of receiver circuits or components may be, in some instances, implementation-dependent.

A controller 314 maintains overall operational control of the throwbox 300. The controller 314 is coupled to the receiver front-end circuitry 306 and the signal processor 328. In some examples, the controller 314 is also coupled to at least one memory, such as random access memory 317 configured to store data content and a memory device 316 that selectively stores operating regimes, such as decoding/encoding functions, synchronization patterns, code sequences, and the like. A timer 318 is operably coupled to the controller 314 to control the timing of operations (e.g. transmission or reception of time-dependent signals) within the connected throwbox 300.

As regards the transmit chain, the signal processor 328 may process and formulate data for transmission to transmitter/modulation circuitry 322 and thereafter a power amplifier 324 and on to the antenna 302, 303 antenna array, or plurality of antennas for transmitting the data. The transmitter/modulation circuitry 322 and the power amplifier 324 are operationally responsive to the controller 314.

In accordance with example embodiments, signal processor 328 of connected throwbox 300 has been configured to support both WiFi™ and LTE™ operation. In some examples, a signal processor 338 supporting WiFi™ may be implemented as distinct from the signal processor 339 supporting LTE™, as shown. Alternatively, a single processor may be used to support both WiFi™ and LTE™ operation. In some examples, the transmitter and/or receiver circuit may be duplicated, one dedicated for LTE™ operation and one dedicated for WiFi™ operation. Clearly, the various components within the connected throwbox 300 can be realized in discrete or integrated component form, with an ultimate structure therefore being an application-specific or design selection.

In accordance with some example embodiments, the receiver 306 of the connected throwbox 300 may be configured to receive via antenna 302 and store data content when connected to at least one of: a cellular network node, such as a wireless base station over an LTE™ channel 322, for example, or an Internet Protocol network, and may also be configured to transmit retrieved data content to one or multiple mobile wireless communication units, via antenna 303 over the WiFi (mesh) network 321.

The at least one memory 316, operably coupled to the at least one receiver 306, is configured to store the received data content. In some examples, the transmitter may also be configured to broadcast or transmit a message to mobile wireless communication units when no longer connected to the at least one of: a cellular network node an Internet Protocol network, where the message indicates that the connected throwbox 300 contains specific data content. The signal processor 328 of connected throwbox 300 is configured to send data (bundles) to mobile wireless communication units (e.g. smartphones) that discover it. The smartphone may then pass this data to other devices or communication units that it encounters, which can eventually mean that data is passed to out of coverage devices. So for example smartphone #1 may encounter the connected throwbox 300 and, whilst still in WiFi™ coverage of the connected throwbox 300, downloads a bundle of data (say the local weather). Smartphone #1 may then move, and subsequently encounters smartphone #2, and it copies and passes the bundle of data to this device. Smartphone #2 may or may not be in WiFi™ coverage of the connected throwbox 300. Smartphone #2 may then move, and perhaps transition outside WiFi™ coverage or LTE™ coverage, encounters smartphone #3, and further passes the bundle of data to this device. In examples of the invention, this model of data transmission is not necessarily to be used to provide data to an out-of-coverage (either WiFi™ or LTE™) location, it is simply an alternative to conventional connectivity.

Thus, examples of the invention describe the addition of cellular connectivity to the connected throwbox 300 concept in order to creating a network where the wireless communication unit that supports both cellular communication and short-range communication (such as WiFi™), e.g. a connected throwbox 300, becomes a gateway into and out of the opportunistic network, based on a use of a bundle protocol. This is in contrast to the known functionality of throwboxes that have no internet connectivity (WiFi™, Ethernet, cellular or otherwise) and only deal with managing contact with other opportunistic devices. Also, in example embodiments of the present invention, it is envisaged that the connected throwbox may use (and benefit from) conventional client/server mechanisms in order to obtain data from network servers, and then convert this into bundles of data to be disseminated into the opportunistic network. In some examples, the signal processor of the connected throwbox 300 is modified to support and form a publish and subscribe network.

In some examples, the transmission of the accessed data content to at least one wireless remote communication unit may be made upon receipt of a request for such data content from the at least one wireless remote communication unit.

In some examples, the data content may be time limited, e.g. relating a news item for a particular day or relating to a time limited offer. In this example, the transmitter may be configured to transmit the data content for a limited period of time and indicate within the bundle the period over which the bundle is valid. In some examples where the bundle has a limited physical distance validity from the throwbox, it is envisaged that an indication may be provided within the bundle of the distance over which it is valid, thereby preventing bundles being swapped between smartphone when outside of this range.

In this example, the data content may be received at the connected throwbox 300 using a first technology, e.g. which may be a $3^{rd}$ generation partnership project technology such as LTE™, and ultimately transmitted using a second different technology, e.g. which may be a short range wireless technology such as WiFi™.

Figure 4:
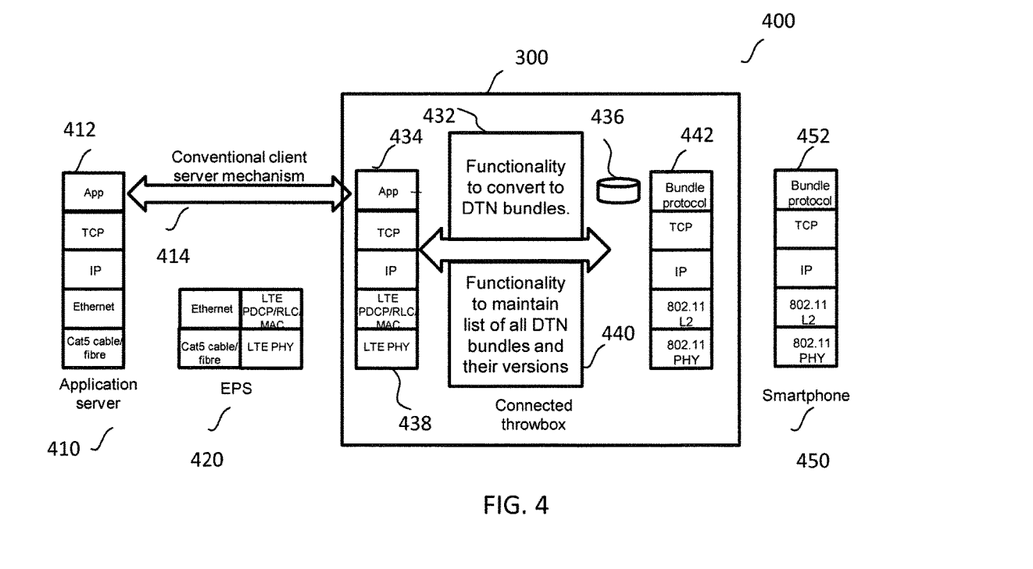
FIG. 4 illustrates a further example block diagram of a throwbox showing the data protocol functionality in accordance with some example embodiments of the present invention.

FIG. 4 illustrates an example block diagram 400 comprising a connected throwbox 300 that operates a bundle protocol 442, in accordance with some example embodiments of the present invention. In FIG. 4, a conventional client server mechanism 414 exists between a source node, which in this example is an application server 410, with an application layer 412 within the protocol stack. The conventional client server mechanism 414 carries data over, in this example, an evolved packet system (EPS) 420 to connected throwbox 300. As illustrated, connected throwbox 300 receives data from the application server 410 across an LTE™ physical layer 438 and recovers the data at an application layer 434. In this example, connected throwbox 300 is configured to convert this received data into DTN bundles, e.g. a first containing news, a second containing weather, a third containing vouchers, etc. In this example, the connected throwbox 300 comprises a circuit (or functional logic or components) to convert 432 the received data packets to DTN bundles of data.

In addition, the connected throwbox 300 comprises a circuit (or functional logic or components) to maintain a list of all DTN bundles and their versions 440 the received data packets to DTN bundles of data. In some examples, the connected throwbox 300 maintains a list of all the services available in the opportunistic network. In this manner, it is possible to maintain a list of all the currently published data that is available from the connected throwbox 300 and ensuring that if new data comes from the network/application server(s) 410, then this list is appropriately updated.

In some examples, connected throwbox 300 may advertise these services to smartphones that come into range using 802.11 WiFi™ functionality. For example a publish and subscribe mechanism may be supported such that users in the DTN network may sign up to receive, say, data of interest, such as weather updates. The subscribers need to know if the DTN bundle available in the connected throwbox 300 contains an updated weather forecast, so that they know if they need/want to download it. Thus, in this manner, client-server mechanisms (using cellular connectivity) are used to maintain a set of up-to-date data, for example, to maintain set of up to date news, weather, vouchers to be used in the locality etc. In some examples, it is noteworthy that such a list of available services may be contained in another DTN bundle. In this manner, smartphones that never come into contact with the connected throwbox 300 may still find out what is available in the publish and subscribe list. This is achieved by the fact that this service description bundle (as well as other bundles) may be passed directly between smartphones.

Within connected throwbox 300, and when using a bundle protocol layer 442, all the information that is to be sent is bundled in a single data package, which introduces a delay into the data stream to be delivered, from a store 436 of delayed messages. The bundle is then sent when, say, WiFi™ connectivity is available to one or more mobile wireless communication units, such as smartphones 450 that pass through WiFi™ coverage of the connected throwbox 300. Transfer of bundles to smartphones may be based on requests and/or, for example, the connected throwbox 300 may make a decision on the bundles it wants to send out/advertise based on the users' subscription and the versions available. The one or more mobile wireless communication units need to include the functionality associated with processing bundle protocol data 452

In this manner, by using the bundle protocol, communication is possible within fractured networks, where such networks are termed delay (or disruption) tolerant networks (DTNs), i.e. the repeated introduction of additional delays in delivering the data is deemed acceptable, as the data is delay tolerant. In some examples, a DTN bundle may be created for a list of services, with this bundle created entirely by the connected throwbox (in addition to DTN bundles associated with data from network servers).

Figure 5:
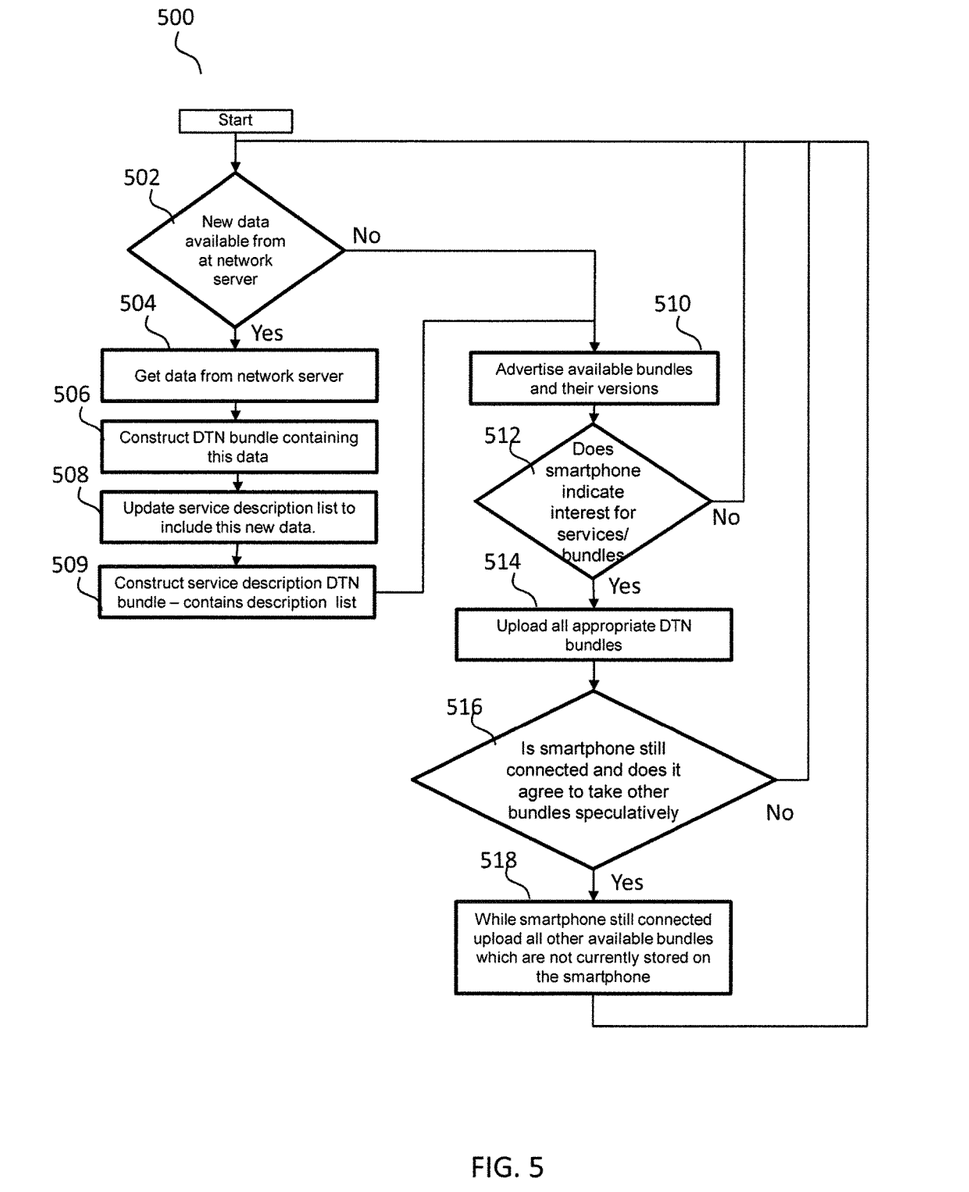
FIG. 5 illustrates an example downlink flowchart of a wireless communication system, in accordance with some example embodiments of the present invention.

FIG. 5 illustrates a simple example of a downlink flowchart 500 of a wireless communication unit, such as connected throwbox 300, operating in a wireless communication system, in accordance with some example embodiments of the present invention. A skilled artisan will appreciate that the example of a downlink flowchart 500 of a connected throwbox 300 represents a simplified overview of the connected throwbox functionality, as there is multiple concurrent functions relating to many aspects of the connected throwbox that are being supported. The flowchart 500 illustrates sharing delay tolerant content, by a wireless communication unit: through receiving content over a cellular network from a network server using a conventional client server mechanism; converting the received content into a bundle format that can be transmitted into a delay tolerant network; storing the bundle formatted content in at least one memory; extracting the bundle formatted content from the at least one memory; and transmitting the extracted bundle formatted content to at least one wireless mobile communication unit using a short range wireless communication technology.

The example downlink flowchart 500 starts and transitions to 502, where new data is available at a network server, such as an application server. The connected throwbox 300 obtains this data from the network server at 504, and thereafter constructs a DTN bundle containing this obtained/downloaded data at 506. After updating the DTN bundle in 506, the connected throwbox 300 updates its service description list to include this new data in 508. The service description DTN bundle is then constructed in 509, containing the service description list, for example based on the list of available services and/or their versions.

The updated service description list is then advertised by the connected throwbox 300 at 510. At 512, a determination is made by connected throwbox 300 as to whether it has received any interest in the updated service description list by any mobile wireless communication unit. If there is a received interest, the flowchart moves on to 514, whereby the connected throwbox 300 uploads the appropriate DTN bundles from its memory store. Once the appropriate DTN bundles have been uploaded from its memory store, a determination is made as to whether the mobile wireless communication unit is still connected over the short-range link (e.g. WiFi™), and whether the mobile wireless communication unit has agreed to take other bundles speculatively at 516. If, at 516, the mobile wireless communication unit is still connected over the short-range link (e.g. WiFi™), and the mobile wireless communication unit has agreed to take other bundles speculatively, then whilst it is connected all other available bundles that are not currently stored on the mobile wireless communication unit are uploaded to the mobile wireless communication unit at 518. Thereafter, the flowchart returns to 502. Also, if there is no received interest in the updated service description list by any mobile wireless communication unit at 512, or the (one or more) mobile wireless communication unit(s) are no longer within WiFi™ range or they have not agreed to take bundles speculatively, the flowchart moves on to 502.

To explain one application or context of the examples described herein, let us consider a situation where a coffee shop may want to advertise its services by offering a voucher. Here, devices within cellular coverage receive the voucher, and store the data content locally within the device. As a device roams around the town, it transmits to other devices in the local vicinity that have the coffee shop app., notifying them of the availability of a voucher. If the user is interested, and registers the interest, the voucher is re-transmitted to the device of interest, and that device then also stores the voucher, and if desired, may also pass it on to other devices in turn. In some examples, it is envisaged that a geographical range from the throwbox to a device for a bundle transmission may be limited. This creates a defined geographic region over which the bundle can be propagated. This communication would be using peer-to-peer communication, such as Wi-Fi™, rather than cellular.

In this manner, a node with UE functionality that takes data from a network server using conventional client server mechanisms then converts the extracted data into a DTN bundle and sends this to encounter devices using WiFi™. The encountered devices themselves may pass the bundle on to other encountered devices.

In some examples, it is envisaged that the data content may be relevant for a period of time, e.g. information provided before a concert or a sporting event commences. In such an example, it is envisaged that the transmitter may be configured to transmit the data content for a limited period of time, i.e. whilst the data content has value and is valid.

In some examples, it is also envisaged that the data content may be delay tolerant, i.e. it is not required urgently or in a time-critical sense, thereby enabling communication without having contemporaneous connections. One example could also be the latest news of the day.

Figure 6:
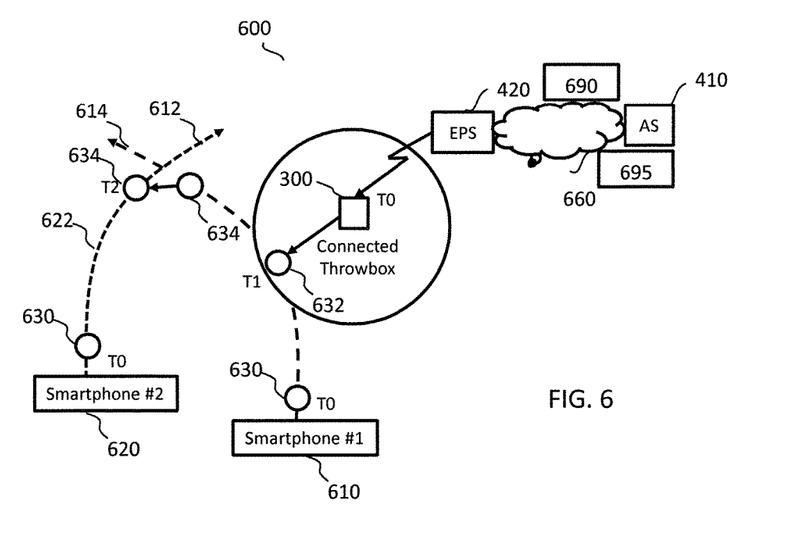
FIG. 6 illustrates an example downlink data communication arrangement in a wireless communication system, in accordance with some example embodiments of the present invention.

Referring now to FIG. 6, an example downlink data communication arrangement in a wireless communication system 600 is illustrated, in accordance with some example embodiments of the present invention. A wireless communication unit, such as a connected throwbox 300, communicates on an LTE™ bearer 121 with an evolved packet system (EPS) 420, which may comprise an eNodeB and thereafter a packet gateway (PGW) and service gateway (SGW) (not shown). The EPS 420 is connected to a public network, such as the Internet 660, supporting Internet Protocol (IP) communication, which in turn is connected to an application server (AS) 410.

At time T0 630 connected throwbox 300 downloads some data from a server, such as application server 410 connected to the internet 660. The data may be downloaded using a cellular connection, for example an LTE™ bearer in this example, but could be other technologies, such as 3G, in other examples. At this time T0 there are no smartphones within the range of the device-to-device (D2D) connection technology, typically WiFi™ or Bluetooth™ or similar short range technology. However, in examples of the invention, the data is not discarded by the connected throwbox 300, but is saved in memory. In this example, the downloaded data is contained in a DTN protocol bundle, such as that described in RFC 5050. The DTN protocol bundle may, for example, be available from any network servers connected to the public data network, (e.g. the internet), such as: a web page bundle, a music file bundle, a video bundle.

Furthermore, at time T0 630, a first wireless communication unit, such as smartphone #1 610 and a second wireless communication unit, such as smartphone #2 620 are located outside of a WiFi™ coverage area of connected throwbox 300.

Smartphone #1 610 is following a first path 614, whereas smartphone #2 620 is following a second path 612. At time T1 632 smartphone #1 610 enters a WiFi coverage area of connected throwbox 300 and uses the D2D connection technology. The two devices (connected throwbox 300 and smartphone #1 610) discover each other and the connected throwbox 300 advertises that it has data to send. Service discovery techniques, such as the use of Generic Advertisement Service (as defined in WIFi direct specification) may be used to indicate the nature of this data. Smartphone #1 610 downloads the data and this can be provided to the smartphone user.

After downloading the data, and at time T2 634, smartphone #1 610 encounters another smartphone, smartphone #2 620. These devices (smartphone #1 610 and smartphone #2 620) discover each other, again using D2D connection technology, such as WiFi™ and the data originally obtained by smartphone #1 610 from the connected throwbox 300 is transferred to smartphone #2 620. It is noteworthy that, in some examples, smartphone #2 620 need not be interested in the data itself but can still store it in order to pass it on subsequently to other smartphone users who may be interested. The connected throwbox 300 continues to transfer the data to any other smartphones that enter/pass through its WiFi™ coverage area.

In some examples, different data may be published from different connected throwboxes due to a provision of a network node 690, shown as operably coupled to the data network, such as the internet 660, which is configured to function as a control and management entity, for example to manage 'publish and subscribe' operations into the opportunistic network. The network node 690 may comprise a processor and transmitter functionality and be configured to control the data that is published from each throwbox. In some examples, the connected throwbox 300 may register with the network node 690, and the processor in the network node 690 may be configured to provide a list of the data that it should periodically obtain from network servers, such as Application server 410. For example, when there is an update to the data, a new bundle could be published. In some examples, the control of the content published from the throwbox, as managed by the network node 690, may be accessible by the owner of the throwbox. In some examples, when the data published into the opportunistic network requires authenticating, the processor of the network node 690 may be configured to generate a message for the throwbox that identifies the security keys to use when ciphering and authenticating.

Thus, in some examples, the aforementioned wireless communication system 600 may be considered a publish and subscribe mechanism, whereby users subscribe to particular services that they are interested in. In this manner, WiFi™ service discovery may be used to indicate what bundles a smartphone has within its memory. An encountering smartphone compares this data with the subscriptions that it is interested in, and only then actually forms a WiFi™ association if it has something that it actually wants. The bundles may be ordered in priority (as contacts may be short and therefore needed to be prioritised appropriately). The first bundle(s) that is/are transferred are those that the other user is actually subscribed to, then if there is time further bundles that the user has not indicated an interest in may be transferred in the hope of subsequent encounters.

In some examples, a further network node 695, shown as operably coupled to the data network, such as the internet 660, is configured to manage, inter alia, security keys. Further network node 695 ensures that a connected throwbox, such as connected throwbox 300, is provided with the appropriate cryptographic keying material that is used to secure bundles transmitted by the connected throwbox. For example, a processor may be configured to generate a message identifying keys to use when ciphering and authenticating the data published into an opportunistic network. In some examples, the connected throwbox may register with the network node 690, and a processor in the further network node 695 may be configured to generate a message identifying keys, such as cryptographic keys, to use when ciphering and authenticating the data published into an opportunistic network and send the message to the connected throwbox, 300. A smartphone that wishes to receive data in the publish and subscribe system may also register with a security management circuit within further network node 695 in order to also be provided with appropriate cryptographic material that corresponds to the material provided to the connected throwbox 300. This enables the smartphone to also decrypt bundles transmitted from the connected throwbox 300.

Figure 7:
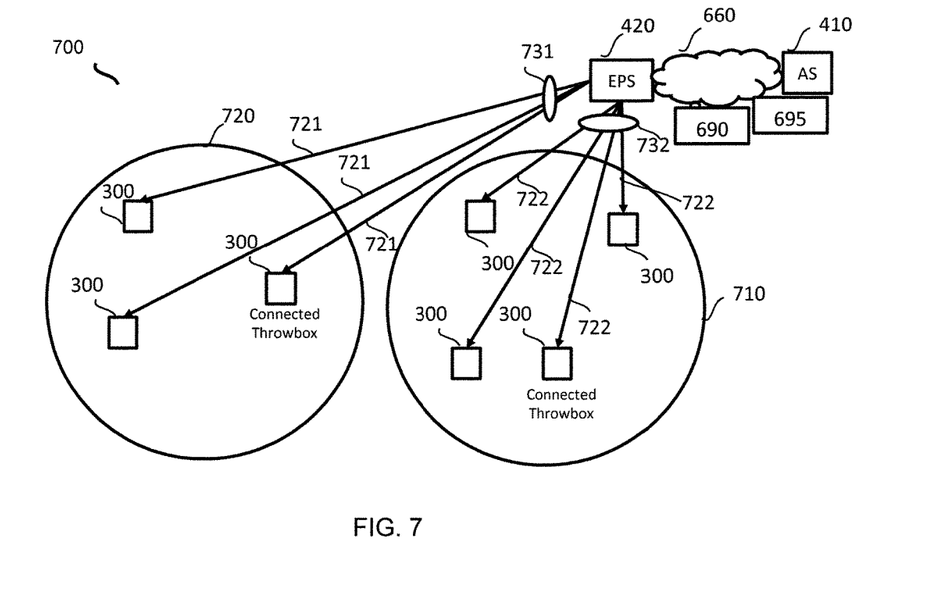
FIG. 7 illustrates an example wireless communication system configured to 'seed' data into a wide, but defined, geographic area (in a downlink manner) using a number of local connected throwboxes, in accordance with some example embodiments of the present invention.

FIG. 7 illustrates an example wireless communication system configured to 'seed' data into a wide, but defined, geographic area (in a downlink manner) using a number of local connected throwboxes, in accordance with some example embodiments of the present invention. Thus, in some examples, different data may be published from different connected throwboxes due to a provision of a network node 690, shown as operably coupled to the data network, such as the internet 660, which is configured to function as a control and management entity, for example to manage 'publish and subscribe' operations into the opportunistic network. The network node 690 may comprise a processor and transmitter functionality and be configured to control the data that is published from each throwbox. In some examples, the connected throwbox 300 may register with a 'publish and subscribe' management function located in the network, and this may provide a list of the data that it should periodically obtain from network servers, such as Application server 410. For example, when there is an update to the data, a new bundle should be published. This control of the content published from the throwbox, in a central node that the owner of the throwbox has access to, may then facilitate a geographic distinction of data from specific throwboxes.

In this example, there are two localities or events: a music festival 720 and a retail area 710 in a city centre. Here, multiple wireless communication units, such as multiple connected throwboxes 300 located at the music festival 720 communicate, say, on respective LTE™ bearers 721 with an evolved packet system (EPS) 420, which may comprise an eNodeB and thereafter a packet gateway (PGW) and service gateway (SGW) (not shown). The EPS 420 is connected to a public network, such as the Internet 660, supporting Internet Protocol (IP) communication, which in turn is connected to an application server (AS) 410.

In this example, the multiple connected throwboxes 300 located at the music festival 720 download, say, information 731 regarding band lineups and updates over the respective LTE™ bearers 721. The multiple connected throwboxes 300 thereafter transfer this data to any/all wireless communication units (such as smartphones) that enter or pass through the WiFi™ coverage area of the multiple connected throwboxes 300 located at the music festival 720. Each of the festival goers smartphones may then pass on the information 731 to other festival goers in the restricted area of the music festival, in a similar manner to that described earlier. In this case, for example, a person who owns the throwboxes in the festival site may configure the site/throwboxes (via the 'publish and subscribe' management function) to download festival information from a network server. Likewise, the owner of a throwbox in a retail location may configure the 'publish and subscribe' management function to ensure that their throwbox published information related to their business. For example, when there is an update to the data, a new bundle could be published. In some examples, the control of the content published from the throwbox, as managed by the network node 690, may be accessible by the owner of the throwbox.

In a similar manner, other multiple connected throwboxes 300 located a retail area 710 in a city centre download, say, information 732 regarding retail shopping offers or vouchers over the respective LTE™ bearers 722. The multiple connected throwboxes 300 thereafter transfer this data to any/all wireless communication units (such as smartphones) that enter or pass through the WiFi™ coverage area of the multiple connected throwboxes 300 located a retail area 710 in a city centre. Each of the shopper's smartphones may then pass on the information 732 to other shoppers in the restricted area of the retail area.

In this manner, specific data related to the locality or event may be distributed (seeded) by an efficient means.

Figure 8:
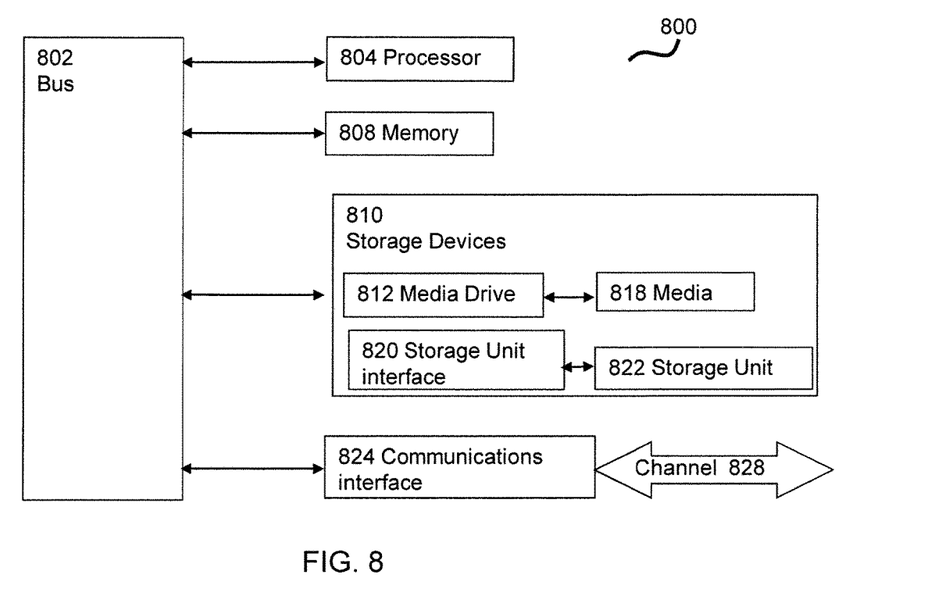
FIG. 8 illustrates a typical computing system that may be employed a wireless communication unit to perform an enforcement role in accordance with some example embodiments of the invention.

Referring now to FIG. 8, there is illustrated a typical computing system 800 that may be employed to for sharing delay tolerant content in some example embodiments of the invention. Computing systems of this type may be used in wireless communication units. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control logic (in this example, software instructions or computer program code), when executed by the processor 804, causes the processor 804 to perform the functions of the invention as described herein.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

In one example, a non-transitory tangible computer program product comprises executable code stored therein, and may be used for sharing delay tolerant content between wireless communication units. The executable program code may be operable for, when executed at a wireless communication unit: receiving content over a cellular network from a network server using a conventional client server mechanism; converting the received content into a bundle format that can be transmitted into a delay tolerant network; storing the bundle formatted content in at least one memory; extracting the bundle formatted content from the at least one memory; and transmitting the extracted bundle formatted content to at least one wireless mobile communication unit using a short range wireless communication technology.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

For example, an integrated circuit may be suitable for a wireless communication unit. In this example, the integrated circuit comprises: a processor operably coupled to a cellular receiver and configured to receive content from a network server using a conventional client server mechanism and convert the received content into a bundle format that can be transmitted into a delay tolerant network; at least one memory operably coupled to the processor and configured to store the bundle formatted content; and at least one short-range wireless circuit operably coupled to the at least one memory and configured to extract the bundle formatted content from the at least one memory and transmit the extracted bundle formatted content to at least one wireless mobile communication unit using a short range wireless communication technology.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

I claim:

1. A wireless communication unit arranged to communicate with one or more wireless mobile communication units, the wireless communication unit comprising:
    a cellular receiver arranged to receive content from a network server using a conventional client server mechanism;
    a processor operably coupled to the cellular receiver and configured to convert the received content into a bundle format that can be transmitted into a delay tolerant network;
    at least one memory operably coupled to the processor and configured to store the bundle formatted content; and
    at least one short-range wireless circuit operably coupled to the at least one memory and configured to extract the bundle formatted content from the at least one memory and transmit the extracted bundle formatted content to at least one wireless mobile communication unit using a short range wireless communication technology.

2. The wireless communication unit of claim 1 wherein the processor is further configured to manage a status of data content and download new data content in bundle format to the at least one memory if new data content is available from the network server.

3. The wireless communication unit of claim 2 wherein the status of data content comprises a list of delay tolerant network, DTN, bundles, and/or versions thereof.

4. The wireless communication unit of claim 2 wherein the status of data content relates to services available in an opportunistic network and the processor is further configured to maintain a list of services available in the opportunistic network.

5. The wireless communication unit of claim 4 wherein the processor is further configured to download data content related to those services from the list.

6. The wireless communication unit of claim 4 wherein the processor is further configured to control the content of data published into the opportunistic network.

7. The wireless communication unit of claim 5 wherein the processor is further configured to update the list in response to constructing a new bundle of content.

8. The wireless communication unit of claim 4 wherein the processor is further configured to generate a message identifying keys to use when ciphering and authenticating the data published into the opportunistic network.

9. The wireless communication unit of claim 4 wherein the processor is further configured to wirelessly advertise the list of services short range wireless communication technology as a bundle to at least one passing wireless mobile communication unit.

10. The wireless communication unit of claim 9 wherein the at least one short-range wireless circuit comprises at least one short-range wireless receiver operably coupled to the processor and configured to receive and process a message indicating an interest in a bundle of content.

11. The wireless communication unit of claim 10 wherein the processor is configured to receive the indication of the interest in the bundle of content from the at least one passing wireless mobile communication unit and in response thereto and compare the indication of interest in the bundle of content with bundle of content stored in the at least one memory, and connect to the at least one passing wireless mobile communication unit if there is a match.

12. The wireless communication unit of claim 11 wherein, in response to a match, the processor is configured to extract matched bundle formatted content from the at least one memory and transmit the extracted matched bundle formatted content to the at least one wireless mobile communication unit using the short range wireless communication technology.

13. The wireless communication unit of claim 10 wherein the processor is configured to transmit speculatively other bundle formatted content to the at least one wireless mobile communication unit using the short range wireless communication technology when connected thereto.

14. The wireless communication unit of claim 1 wherein the processor is further configured to generate a message that includes an indication representative of a geographical area over which the bundle of data is to be considered valid.

15. The wireless communication unit of claim 1 wherein the content is converted to a bundle as defined in RFC 5050.

16. The wireless communication unit of claim 1 wherein the cellular receiver and processor are configured to receive geographically relevant content from a network server using a conventional client server mechanism related to a geographical location of the wireless communication unit for distribution to passing wireless mobile communication units within its geographical area using short range wireless technology.

17. A method for sharing delay tolerant content at a wireless communication unit, the method comprising:
   receiving content over a cellular network from a network server using a conventional client server mechanism;
   converting the received content into a bundle format that can be transmitted into a delay tolerant network;
   storing the bundle formatted content in at least one memory;
   extracting the bundle formatted content from the at least one memory; and
   transmitting the extracted bundle formatted content to at least one wireless mobile communication unit using a short range wireless communication technology.

18. A wireless communication system that comprises a cellular network and at least one wireless communication unit arranged to communicate with one or more wireless mobile communication units; the at least one wireless communication unit comprising:
   a cellular receiver arranged to receive content from a network server over the cellular network using a conventional client server mechanism;
   a processor operably coupled to the cellular receiver and configured to convert the received content into a bundle format that can be transmitted into a delay tolerant network;
   at least one memory operably coupled to the processor and configured to store the bundle formatted content; and
   at least one short-range wireless circuit operably coupled to the at least one memory and configured to extract the bundle formatted content from the at least one memory and transmit the extracted bundle formatted content to at least one wireless mobile communication unit using a short range wireless communication technology.

19. A network node for communicating with the wireless communication unit according to claim 1, wherein the network node comprises a processor operably coupled to a transmitter and configured to manage the content associated with a list of services that is downloaded to the wireless communication unit and subsequently converted into bundles for distribution in an opportunistic network.

20. A mobile wireless communication unit for communicating with a wireless communication unit, the mobile wireless communication unit comprising:
   at least one short-range wireless circuit and configured to receive content in a bundle format over a delay tolerant network, using a short range wireless communication technology, wherein the bundle formatted content had been converted from content received from a network server over the cellular network using a conventional client server mechanism; and
   a processor operably coupled to the at least one short-range wireless circuit and configured to extract the bundle formatted content for use by the mobile wireless communication unit.

* * * * *